United States Patent
Jacob et al.

(10) Patent No.: US 9,079,147 B2
(45) Date of Patent: Jul. 14, 2015

(54) METHOD AND APPARATUS FOR THE TREATMENT OF FINE-GRAINED MATERIAL IN A SPOUTED BED

(75) Inventors: Michael Jacob, Weimar (DE);
Karlheinz Rümpler, Weimar (DE);
Frank Ohlendorf, Kerspleben (DE);
Tilo Klöppel, Weimar-Taubach (DE)

(73) Assignee: Glatt Ingenieurtechnik GmbH, Weimar (DE)

( * ) Notice: Subject to any disclaimer, the term of this patent is extended or adjusted under 35 U.S.C. 154(b) by 984 days.

(21) Appl. No.: 13/063,575

(22) PCT Filed: Jun. 20, 2009

(86) PCT No.: PCT/EP2009/004473
§ 371 (c)(1),
(2), (4) Date: May 27, 2011

(87) PCT Pub. No.: WO2010/028710
PCT Pub. Date: Mar. 18, 2010

(65) Prior Publication Data
US 2011/0228628 A1    Sep. 22, 2011

(30) Foreign Application Priority Data
Sep. 11, 2008  (DE) .................. 10 2008 046 772

(51) Int. Cl.
*B01F 13/02*   (2006.01)
*B01J 2/16*    (2006.01)

(52) U.S. Cl.
CPC .......................................... *B01J 2/16* (2013.01)

(58) Field of Classification Search
None
See application file for complete search history.

(56) References Cited

U.S. PATENT DOCUMENTS

| 4,372,228 | A | * | 2/1983 | Korenberg | .................... 110/347 |
| 4,556,175 | A | * | 12/1985 | Motoyama et al. | ............. 241/57 |

(Continued)

FOREIGN PATENT DOCUMENTS

| DE | 3117892 | 3/1982 |
| DE | 4304405 | 8/1994 |

(Continued)

OTHER PUBLICATIONS

Machine translation of WO 02/100527 A1, Huttlin, H.*

*Primary Examiner* — Jill Warden
*Assistant Examiner* — Benjamin Whatley
(74) *Attorney, Agent, or Firm* — Volpe and Koenig, P.C.

(57) ABSTRACT

A method and an associated apparatus for treating fine-grained material in a spouted bed. Here, the method and design for an associated apparatus for treating fine-grained material in a spouted bed eliminate the drawbacks of the prior art, allow different process conditions in the process chamber to be adjusted in a regulated manner, and has a simple and inexpensive structure. The method is provides that a nearly circular gas flow of the fluidizer is generated in the process chamber (5) by an external annular gap (7) lying on the y-z plane, the diameter of the nearly circular gas flow expands outward in the direction of the x axis inside the process chamber (5), and a nearly circular gas flow of the fluidizer is generated by an internal annular gap (8) lying on the y-z plane, the diameter of the nearly circular gas flow expands inward within the process chamber (5). A displacement member (2) and an annular central contour (9) are centrally disposed in the lower region of the process chamber (5) in such a way that an internal annular gap (7) is formed between the displacement member (2) and the inner contour of the annular central contour (9), while an external annular gap (8) is formed between the outer contour of the annular central contour (9) and the lower outer edge of the process chamber (5) in order to feed the fluidizer.

15 Claims, 2 Drawing Sheets

(56) References Cited

U.S. PATENT DOCUMENTS

| | | | |
|---|---|---|---|
| 5,145,650 A * | 9/1992 | Huttlin | 422/143 |
| 2003/0200919 A1* | 10/2003 | Jones et al. | 118/303 |
| 2004/0131791 A1* | 7/2004 | Torben-Walter et al. | 427/425 |
| 2007/0093403 A1* | 4/2007 | Rumpler et al. | 510/320 |
| 2007/0234586 A1* | 10/2007 | Huettlin | 34/77 |

FOREIGN PATENT DOCUMENTS

| | | |
|---|---|---|
| DE | 10322062 | 12/2004 |
| WO | 02100527 | 12/2002 |

* cited by examiner

METHOD AND APPARATUS FOR THE TREATMENT OF FINE-GRAINED MATERIAL IN A SPOUTED BED

BACKGROUND

The invention relates to a method for the treatment of fine-grained material in a spouted bed and a corresponding apparatus.

A method and an apparatus are known from DE 103 22 062 A1 for applying liquids into a flow of solid matter in a spouted bed apparatus. These spouted bed apparatuses are characterized, among other things, in that they comprise a rectangular reaction chamber and a fluidizer, consequently arranged in the axial direction of the reaction chamber, in a single or duplicate embodiment. When several reaction chambers are given they are connected to each other via a material overflow. In case of liquids being injected the nozzles required are allocated centrally in the spouted bed apparatus. The fluidizer is embodied in a controllable fashion in order to vary the amount and the flow speed of the processing air. This method and the respective devices are characterized in a linear alignment of the fluidizer.

In such methods and apparatuses it is disadvantageous that there are high requirements with regards to production accuracy of the gas injection device in order to ensure a homogenous flow over the entire length of the apparatus. Furthermore, the longitudinal extension of the apparatus is limited, mandatorily resulting in a deflection of the material flow via the material overflow. Additionally, a large longitudinal geometry of the apparatus results from the longitudinal extension, which leads to the apparatus becoming more expensive.

From DE 31 17 892 A1 a spouted bed apparatus is known for the production of granulates, in which a liquid is inserted into the flow of solid matter in the spouted bed granulator. The spouted bed apparatus exhibits a circular cross-section, with its lower part being embodied conically tapered. A gas channel opens in the central, conical part of the spouted bed granulator, in which a nozzle is arranged for injecting the liquid. A respective gas is fed via said gas channel to maintain the spouted bed. The centrally supplied gas entrains the liquid inserted via the nozzle as well as a portion of the material located in the spouted bed granulator, causing a flow channel to develop in which the material particles are moistened with the liquid. The sprayed material is fed back to the spouted bed via the conical floor so that a circulation of particles develops. When an appropriate granulate size has been reached the particles are removed from the spouted bed granulator.

This type of spouted bed apparatus is disadvantageous in that a homogenous moistening of the material particles with liquid is problematic in such an apparatus and furthermore problems develop in high performance apparatuses with regards to the creation and maintenance of the spouted bed.

The prior art also shows the use of fluidized beds in apparatuses with a circular geometry of the bottom of the spouted bed as well as the entire apparatus for the purpose of dehydration, spray-granulation, agglomeration, or for coating, with the processes being performed either in form of individual charges or in a continuous fashion.

SUMMARY

The object of the invention is to provide a method and a corresponding device for the treatment of fine-grained material in a spouted bed, by which the disadvantages of prior art are avoided and by which the different processing conditions in the process chamber can be adjusted, and with the apparatus being of a simple and cost-effective design.

This object is attained by a method and an apparatus according to the invention.

Due to the fact that in a circular spouted bed apparatus the fluidizing means are supplied in the form of a gas flow via two annular gaps, spaced apart from each other and adjustable with regards to their size, with a gas flow being yielded, by the exterior annular gap expanding conically in the direction of the exterior processing wall and by the interior annular gap expanding conically in the direction of the central line of the process chamber, resulting in a material flow for the material to be treated in the process chamber that is typical for spouted beds. Here, the apparatus according to the invention comprises a displacer, arranged centrally in the lower section of the process chamber and projecting into said process chamber, around which an annular central contour is arranged at a distance. By the arrangement of the displacer in connection with the annular central contour and the interior edge of the process chamber an interior and an exterior annular gap is formed, with the gas flow being fed through its respective gap as the fluidizing means. Here, the gas feeding device is embodied in an adjustable fashion, in order to ensure the variation of the flow amount and/or the flow speed. This occurs by an appropriate arrangement of a control device below the displacer and the annular central contour.

The advantages of the method according to the invention are a simple and safe process control, in which the processing conditions of the material required can be adjusted for the treatment in a controlled fashion. The advantage of the device according to the invention is based on a simple design and an easy production of the largely rotationally-symmetric parts. Due to the circular construction of the spouted bed apparatus only a small space is needed. Simultaneously the mass of the apparatus is reduced.

Other advantageous embodiments are described in the dependent claims, and are explained in the description together with their effects.

BRIEF DESCRIPTION OF THE DRAWINGS

In the following, the invention is explained in greater detail using exemplary embodiments. The corresponding drawings show.

DETAILED DESCRIPTION OF THE PREFERRED EMBODIMENTS

Figure 1:
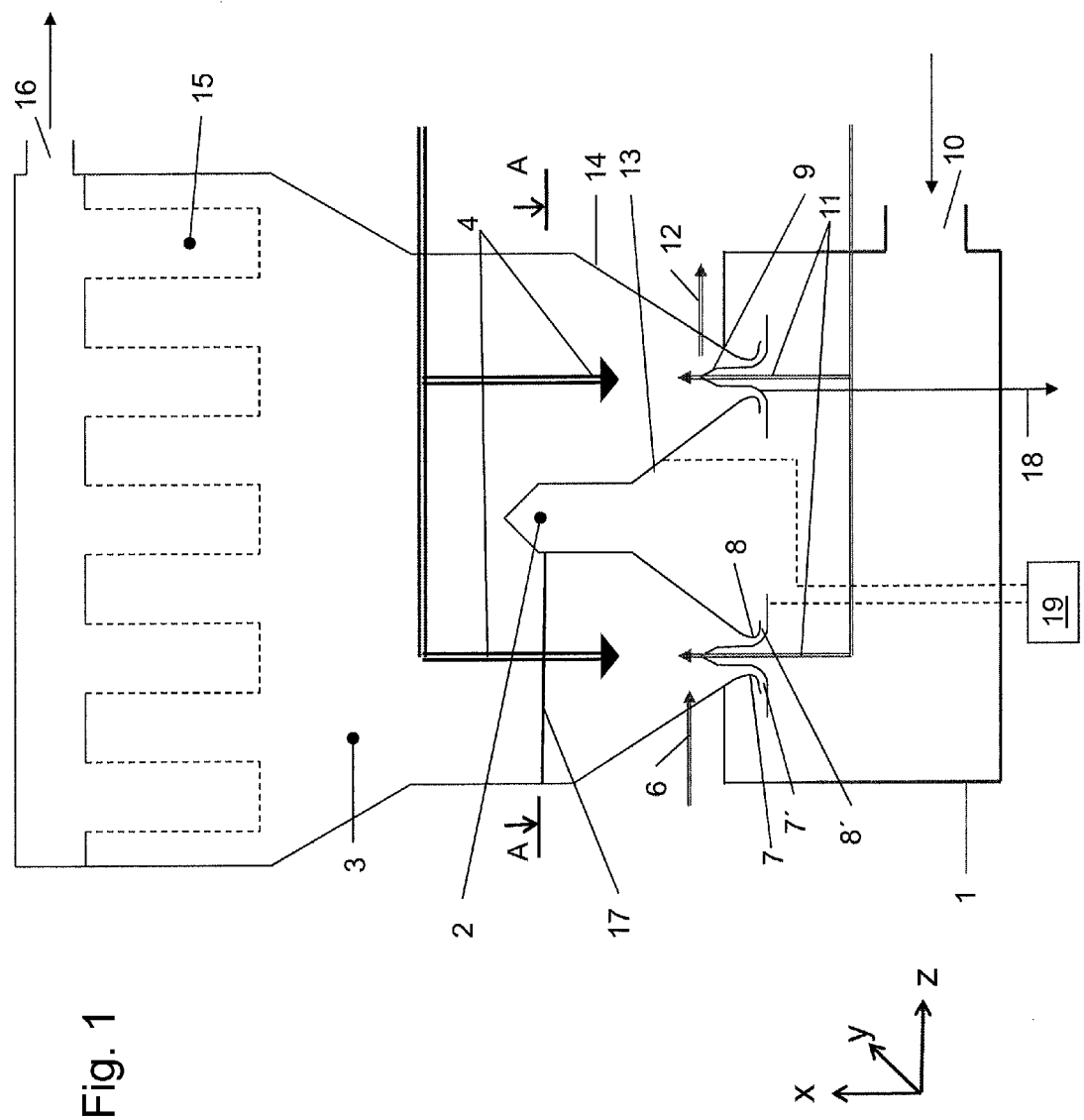
FIG. 1: a spouted bed apparatus according to the invention in a cross-section.

The spouted bed apparatus disclosed in FIG. 1 exhibits a circular design and comprises a process chamber 5, which has one cylindrical section and one conically tapering downwards. A conically widening expansion chamber 3 is arranged above the process chamber 5. A supply air chamber 1 is arranged below the process chamber 5 to feed fluidizing means into the process chamber 5. The entry of the fluidizing means into the supply air chamber 1 is marked 10. Generally, the fluidizing means is a gas flow, which is heated according to the material treatment to be performed in the process chamber 5.

The limiting of the process chamber 5 occurs from the bottom via a displacer 2 arranged centrally and a central contour 9 embodied annularly and arranged at a distance from the displacer 2. The rotationally-symmetric displacer 2 and the central contour 9 are here embodied such that their contour projects into the process chamber 5. The displacer 2 is embodied projecting in the direction of the process chamber 5 and conically tapering in the x-direction, and a cylindrically shaped part may follow, here. Due to this arrangement of the displacer 2 the process chamber 5 has an annular base. From the annular base, the process chamber 5 expands in the direction of the x-axis, on the one side, by a conical exterior contour 14 expanding towards the outside and, on the other side, by the contour 13 of the displacer 2 expanding towards the inside.

The central contour 9 is embodied such that its exterior perimeter is arranged underneath the exterior edge of the process chamber 5, forming a gap 7', and its interior perimeter underneath the exterior edge of the central contour 2, forming a gap 8'. Here, the respective width of the gap extends in the x-direction as discernible from FIG. 1. An adjustment device, not shown, is arranged underneath the displacer 2 and the central contour 9 for the respective adjustment of the width 7' and/or 8' of the gap.

The displacer 2 and the central contour 9 are arranged such that an interior annular gap 8 forms between the displacer 2 and the interior contour of the annular central contour 9 and an exterior annular gap 7 forms between the exterior contour of the annular central contour 9 and the lower exterior edge of the process chamber 5 in order to feed the fluidizing means.

A separating wall 17 is arranged inside the process chamber 5, which extends from the exterior inner wall of the process chamber 5 to the contour of the displacer 2. In the cylindrical area of the expansion chamber 3 a dust removing system 15 and an outlet 16 for the fluidizing means are arranged. An input 6 for solid matter for the material to be treated in the process chamber 5 is arranged in the exterior contour 14 of the process chamber 5. The removal of the material treated in the process chamber 5 occurs via an output 12 for solid matter arranged in the conical exterior contour 14 and/or via one or more outlets 18 for solid matter arranged in the annular central contour 9.

One or more nozzles are provided in order to spray a liquid onto the material located in the process chamber 5. Here, the spraying of the material can occur from the top and/or from the side and/or from the bottom. Any spraying from the bottom in the x-direction occurs by one or more nozzles 11 arranged in the annular central contour 9. Any spraying from the top occurs by nozzles 4 spraying liquids upon the spouted bed. A lateral spraying occurs by one or more nozzles, not shown, which penetrate the exterior wall of the process chamber 5.

The material to be treated in the process chamber 5 is fluidized by the gas flow supplied via the exterior annular gap 7 and the interior annular gap 8. With the two fluidized areas developing here, being annularly conical and expanding towards the outside, on the one side, and expanding inwardly into the process chamber 5, on the other side, it is achieved that material movements typical for spouted beds occur by material located in this area. This is additionally supported in that the gas speed of the gas flow embodied conically and supplied via the exterior annular gap 7 is larger in a respective y-z-plane in the area of smaller diameters than in the area of larger diameters and the speed of the gas flows embodied conically and supplied via the interior annular gap 8 being lower in the area of smaller diameters in a respective y-z-plane than in the area of larger diameters.

Figure 2:
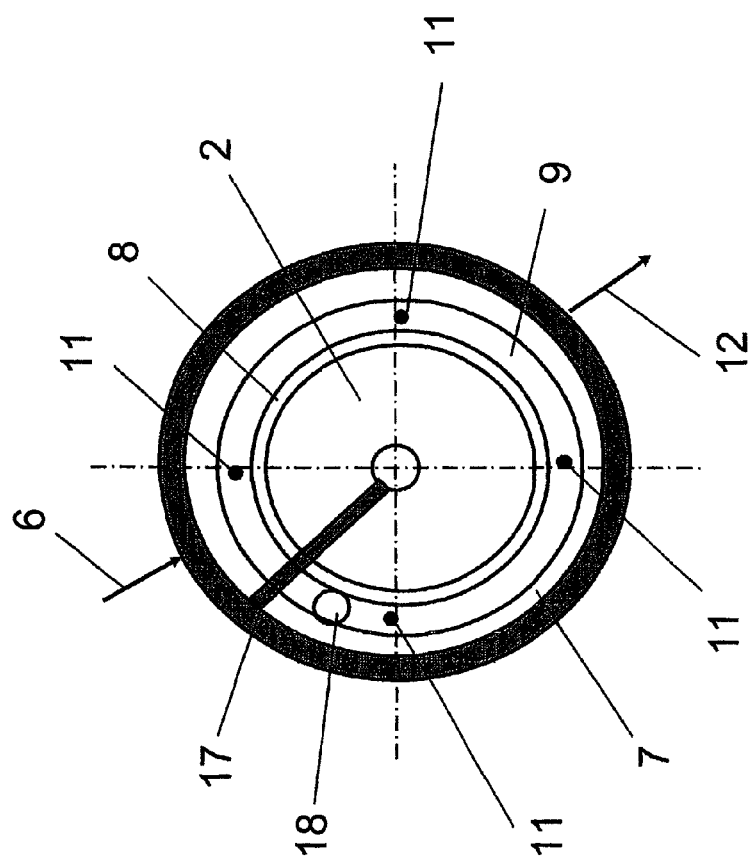
FIG. 2: a cross-section A-A according to FIG. 1.

When using a separating wall 17 the fluidizing area of the material is divided in the process chamber 5. As discernible from FIG. 2, beginning at the separating wall 17 the input 6 for solid matters is arranged at an angle of approx. 10° for dispersed or powdered solid matter. The material to be processed passes the fluidizing area of the process chamber 5 of the spouted bed arrangement in reference to the y-z-plane in a circular fashion, with the material being moistened via the nozzles 4 and/or 11 and dehydrated by the fluidizing medium until it is finally removed from the process via the output 18 for solid matter, for example at an angle of approx. 350°.

A reduction of speed of the gas flow supplied via the annular gap 7 and 8 occurs in the expansion chamber 3 arranged above the process chamber 5, resulting in a separation of the entrained particles. By the dust removing system 15 the entrained dust is separated from the air flow and returned to the spouted bed.

The material transport in the process chamber 5, circular when seen in the y-z-plane, is supported by the width of the gap 7' and 8', separately adjustable. This way, different gas speeds and gas amounts of the fluidizing means can be adjusted via the interior annular gap 8 and the exterior annular gap 7. By an appropriate embodiment of the contour of the gap 7; 7' and 8; 8' simultaneously the influx direction of the gas flow can be influenced by adjusting the width of the gap. Additionally, the movement of material in the process chamber 5 can be influenced by control devices, for example as schematically illustrated at 19 in FIG. 1, which are arranged inside the process chamber 5 at the conical interior wall 14 and/or at the conical contour 13 of the displacer 2 and/or at the central contour 9 projecting into the process chamber 5.

Another influencing of the material treatment in the process chamber 5 can occur by a segmented design of the air supply chamber 1. Using appropriate segments, the fluidizing means can be fed with different temperatures and/or gas speeds and/or gas amounts via the periphery of the annular gap 7 and 8. Appropriate separating walls are arranged in the air supply chamber 1 for segmenting.

Summarizing, the following is stated:

The invention relates to a method and a corresponding apparatus for the treatment of fine-grained material in a spouted bed.

The object of the invention is to provide a method and a corresponding apparatus for the treatment of fine-grained material in a spouted bed, by which the disadvantages of prior art are avoided and by which the different processing conditions in the process chamber can be adjusted in a controlled fashion and with the apparatus showing a simple and cost-effective design.

The method according to the invention is characterized in that in the process chamber 5, via an exterior annular gap 7 located in the y-z-plane, an almost circular gas flow of the fluidizing means is created, its diameter expanding outwards in the direction of the x-axis in the process chamber 5 and via an interior annular gap 8 located in the y-z-plane an almost circular gas flow with its diameter expanding inwardly in the process chamber 5.

The apparatus according to the invention is characterized in that a displacer 2 and an annular central contour 9 are arranged centrally in the lower area of the process chamber 5 such that between the displacer 2 and the interior contour of the annular central contour 9 an interior annular gap 7 and between the exterior contour of the annular central contour 9 and the lower exterior edge of the process chamber 5 an exterior annular gap 8 are formed in order to supply the fluidizing means.

The invention claimed is:

1. A method for the treatment of fine-grained material in a spouted bed, comprising supplying fluidizing means from a bottom of the spouted bed into a process chamber to create and maintain a spouted bed processing flow, creating a gas flow of the fluidizing means in the process chamber (5) via an exterior annular gap (7) located in a y-z-plane, that is almost circular and having a diameter expanding in a direction of an x-axis in the processing chamber (5) towards an outside, creating an almost circular gas flow of the fluidizing means via an interior annular gap (8) located in the y-z-plane, with a diameter expanding inwardly in the direction of the x-axis in the process chamber (5), and adjusting an influx direction of the gas flow supplied via the exterior (7) and the interior annular gap (8) via adjustment of a central displacer (2).

2. A method according to claim 1, wherein a gas speed of the gas from the gas flow supplied via the exterior annular gap (7), which is conically shaped, is greater in a respective y-z-plane in an area of smaller diameter than in an area of greater diameter and a gas speed of the gas flow supplied via the interior annular gap (8), which is conically shaped, is lower in the respective y-z-plane in an area of smaller diameter of an inner conical wall than in an area of larger diameter.

3. A method according to claim 1, wherein the supplying of the process chamber (5) with the fluidizing means is adjustable about a perimeter of the annular gaps (7) and (8).

4. A method according to claim 1, further comprising supplying a material to be treated to the process chamber (5) in an exterior area of the gas flow via the exterior annular gap (7).

5. A method according to claim 1, further comprising spraying a material to be processed in the process chamber (5) from at least one of a top a bottom or a side at one or several points by a liquid.

6. A method according to claim 1, wherein a material supplied to the process chamber (5) passes through the process chamber (5) in a circular fashion in reference to the y-z-plane to an outlet (18) for solid matter.

7. An apparatus for the treatment of fine-grained material in a spouted bed, comprising a cylindrical process chamber embodied conical towards a bottom, in which a gas supply for fluidizing means opens from the bottom, a displacer (2) and a circular central contour (9) are arranged centrally, such that in a lower area of the process chamber (5) between the displacer (2) and an interior contour of the circular central contour (9) an interior annular gap (7) is formed and between an exterior contour of the annular central contour (9) and a lower exterior edge of the process chamber (5) an exterior annular gap (8) is formed to feed the fluidizing means, and wherein the annular central contour (9) and the displacer (2) are each adjustable by a control device in an x-axis direction in order to adjust a size of the interior annular gap (7') and the exterior annular gap (8').

8. An apparatus according to claim 7, wherein the displacer (2) is formed conically tapering in a direction of the process chamber (5) away from the bottom.

9. An apparatus according to claim 7, wherein an air supply chamber (1) is arranged below the process chamber (5).

10. An apparatus according to claim 7, wherein a solid matter inlet (6) and a solid matter outlet (12) are arranged in a conical exterior contour (14) of the process chamber (5).

11. A device according to claim 7, wherein below the annular gaps (7, 8), an air supply chamber (1) is provided, the fluidizing means is fed to the process chamber in an adjustable fashion through the annular gaps (7, 8) with at least one of equal gas speeds, gas amounts or gas temperatures, seen in a circumferential direction.

12. An apparatus according to claim 7, wherein inside the process chamber (5) a separating wall (17) is arranged, which extends from an exterior inner wall of the process chamber (5) to a contour of the displacer (2).

13. An apparatus according to claim 7, wherein one or more solid matter outlets (18) are arranged in the annular central contour (9) and one or more spray nozzles (11) are arranged in the process chamber (5).

14. An apparatus according to claim 7, wherein inside the process chamber (5) at least one of a conical inner wall (14) or a conical contour (13) of the displacer (2) or the central contour (9) projecting into the process chamber (5) are provided with control devices.

15. An apparatus according to claim 7, wherein in the process chamber (5) one or more nozzles (4) are arranged that are adapted to spray liquids from on top onto the material located in the process chamber (5).

* * * * *